(12) United States Patent
Akkiraju et al.

(10) Patent No.: US 8,027,948 B2
(45) Date of Patent: Sep. 27, 2011

(54) METHOD AND SYSTEM FOR GENERATING AN ONTOLOGY

(75) Inventors: Rama Kalyani Akkiraju, San Jose, CA (US); Richard T. Goodwin, Dobbs Ferry, NY (US); Hui Guo, East Elmhurst, NY (US); Anca-Andreea Ivan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 12/024,072

(22) Filed: Jan. 31, 2008

(65) Prior Publication Data

US 2009/0198642 A1    Aug. 6, 2009

(51) Int. Cl.
*G06F 17/00* (2006.01)
*G06N 7/00* (2006.01)
*G06N 7/06* (2006.01)

(52) U.S. Cl. ........................................................ 706/55

(58) Field of Classification Search ........................ None
See application file for complete search history.

(56) References Cited

U.S. PATENT DOCUMENTS

| | | | |
|---|---|---|---|
| 7,487,166 B2 * | 2/2009 | Angele et al. | 1/1 |
| 7,783,659 B2 * | 8/2010 | Akkiraju et al. | 707/766 |
| 2004/0148334 A1 | 7/2004 | Arellano et al. | |
| 2006/0053144 A1 | 3/2006 | Hite et al. | |
| 2006/0075013 A1 | 4/2006 | Hite et al. | |
| 2006/0173868 A1 | 8/2006 | Angele et al. | |
| 2006/0242101 A1 | 10/2006 | Akkiraju et al. | |
| 2007/0156622 A1 * | 7/2007 | Akkiraju et al. | 706/48 |
| 2007/0233457 A1 * | 10/2007 | Kang et al. | 704/8 |

OTHER PUBLICATIONS

Maedche, Alexander et al.; "Ontology Learning for the Semantic Web"; 2005; IEEE Intelligent Systems, vol. 16 Issue 2; pp. 72-79.*
Guo, Hui et al.; "Learning Ontologies to Improve the Quality of Automatic Web Service Matching"; Jul. 2007; IEEE International Conference on Web Services, 2007; pp. 1-8.*
Gue, Hui et al.; "Learning Ontologies to improve the quality of automatic web service matching"; May 2007; Proceedings of the 16th international conference of World Wide Web; pp. 1241-1242.*
Choi, Namyoun et al.; "A survey on ontology mapping"; ACM SIGMOD Record, vol. 35, Issue 3; pp. 34-41.*
Fridman, Natalya et al.; "Algorithm and Tool for Automated Ontology Merging and Alignment"; 2000; AAAI-00 Proceedings; 6 pages.*
Dou, Dejing et al.; "Deriving Axioms Across Ontologies"; 2006; Proceedings of the fifth international joint conference on autonomous agents and multiagent systems; pp. 952-954.*
Massimo Paolucci, et al. "Toward Semantic Web Services", Carnegie Mellon University, Pittsburgh, PA, USA, pp. 1-9.
Amel Bouzeghoub, et al., "Ontology Mapping for Learning Objects Repositories Interoperability", p. 1-2.
Fernando Bobillo, et al. "Towards Semantic Web Services: A Brief Over-View", Department of Computer Sciences and Artificial Intelligence ETS Ingenieria Informatica, University of Granada, pp. 1-8.
Paolo Besana, et al., "Contexts in Dynamic Ontology Mapping", Centre for Intelligent System and their Applications School of Informatics, University of Edinburgh, 2005, American Association for Artificial Intelligence, pp. 1-4.

* cited by examiner

*Primary Examiner* — Jeffrey A Gaffin
*Assistant Examiner* — Stanley K Hill
(74) *Attorney, Agent, or Firm* — McGinn Intellectual Property Law Group, PLLC

(57) ABSTRACT

A method of generating an ontology includes determining plural concepts from a data set by using a first predetermined pattern, using a second predetermined pattern to determine a relationship between the plural concepts, and between a concept and a concept token in the plural concepts, and generating the ontology based on the relationship.

20 Claims, 10 Drawing Sheets

Table 1

| Approach | Correct | Incorrect | Missing | Precision | Recall | F |
|---|---|---|---|---|---|---|
| Dictionary-Based Approach | 120 | 103 | 56 | 0.54 | 0.68 | 0.60 |
| Ontology-Based Approach | 83 | 26 | 93 | 0.76 | 0.47 | 0.58 |
| Ontology-Based Approach (Without Rule 4) | 115 | 26 | 61 | 0.82 | 0.65 | 0.73 |
| Ontology-Based Approach (Without Rule 4) Plus Expert Labels | 172 | 10 | 4 | 0.95 | 0.98 | 0.96 |

FIG. 8

METHOD AND SYSTEM FOR GENERATING AN ONTOLOGY

BACKGROUND OF THE INVENTION

1. Field of the Invention

The present invention relates to a method (and system) for generating an ontology, and more particularly, a method of generating an ontology which determines plural concepts from a data set by using a first predetermined pattern, uses a second predetermined pattern to determine a relationship between the plural concepts, and between a concept and a concept token in the plural concepts, and generates the ontology based on the relationship.

2. Description of the Related Art

The aim of semantic web services is to implement a required task through automatic discovery, matching and composition of web services. This is difficult because the interface descriptions of web services are often terse and cryptic, especially when the services are generated by wrapping legacy code.

Much research has been performed on web service matching. Some researchers have taken a machine learning approach to web service classification. However, these approaches treat all terms from a Web Service Definition Language (WSDL) document as simply a "bag of words" and do not guarantee a match of operations to operations, messages to messages, etc.

Other researchers attempt to find matching service descriptions using dictionary and domain-specific ontologies. However, the dictionary-based approach has limitations, and the conventional ontology-based approach requires human-built ontologies, which is time-consuming and hard to extend to other domains.

Still other researchers describe an approach to operation matching in web services which uses the parameters present in input and outputs of operations (i.e. messages) to determine similarity of operations in web services.

However, all of these approaches use simplistic web services available on the web. There are only a handful of parameters per operation, and only partial matches of parameters can be expected in realistic web services. Thus, it is not clear how these conventional methods scale to industrial strength web services that have few parameters each modeled though by a complete extensible markup language (XML) Schema Definition (e.g., an XSD schema) wherein lies the true information for matching parameters.

SUMMARY OF THE INVENTION

In view of the foregoing and other exemplary problems, drawbacks, and disadvantages of the conventional methods and systems, a purpose of the exemplary aspects of the present invention is to provide a method and system of generating an ontology which may improve a quality of web service matching.

The present invention may learn ontologies from a collection of web services automatically. Most conventional methods involving automatic ontology extraction require a big data set or context information (e.g., corpus, dictionary and relation schema). In addition, the descriptions of web services are often terse and without much context information, which makes these conventional ontology learning methods ineffective. The present invention, on the other hand, may learn ontologies from the web service tags and does not require much context information.

One exemplary aspect of the present invention is directed to a method of generating (e.g., automatically generating) an ontology which includes determining plural concepts from a data set (e.g., a data set describing a web service) by using a first predetermined pattern, using a second predetermined pattern to determine a relationship between the plural concepts, and between a concept and a concept token in the plural concepts, and generating the ontology based on the relationship.

Another exemplary aspect of the present invention is directed to a system for generating (e.g., automatically generating) an ontology which includes a concept determining module for determining plural concepts from a data set by using a first predetermined pattern, a relationship determining module for using a second predetermined pattern to determine a relationship between the plural concepts, and between a concept and a concept token in the plural concepts, and an ontology generator for generating the ontology based on the relationship.

Another exemplary aspect of the present invention is directed to a programmable storage medium tangibly embodying a program of machine-readable instructions executable by a digital processing apparatus to perform a method of generating (e.g., automatically generating) an ontology, the method including determining plural concepts from a data set by using a first predetermined pattern, using a second predetermined pattern to determine a relationship between the plural concepts, and between a concept and a concept token in the plural concepts, and generating the ontology based on the relationship.

In another exemplary aspect of the present invention the method of generating an ontology includes deploying computing infrastructure in which computer-readable code is integrated into a computing system, such that the code and the computing system combine to perform the determining the plural concepts from a data set by using a first predetermined pattern, the using a second predetermined pattern to determine a relationship between the plural concepts, and between a concept and a concept token in the plural concepts, and the generating the ontology based on the relationship.

With its unique and novel features, the present invention provides a method and system of generating an ontology which may improve a quality of web service matching.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 8 provides Table 1 which includes the results of this evaluation;

DETAILED DESCRIPTION OF EXEMPLARY EMBODIMENTS OF THE INVENTION

Figure 1:
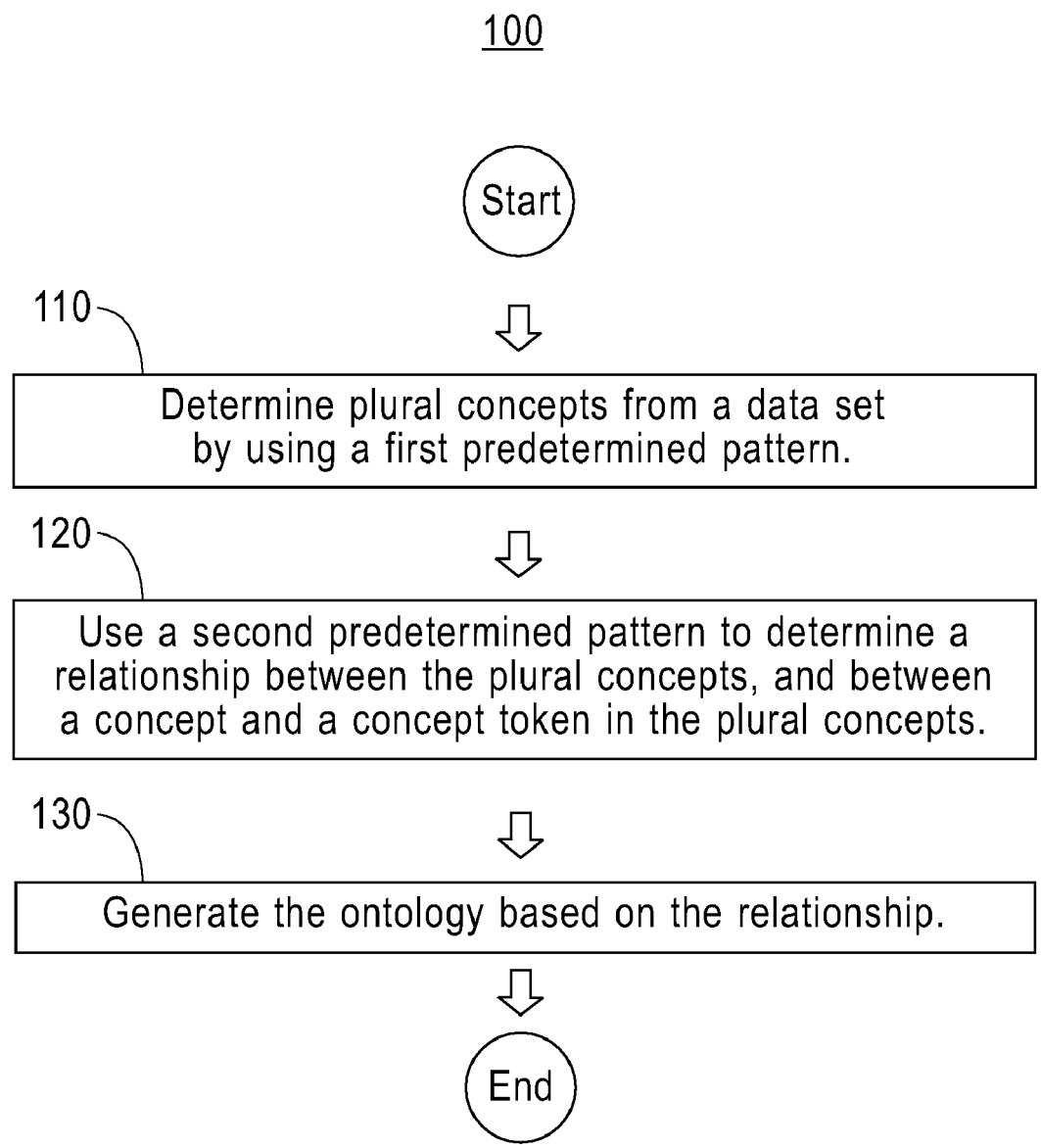
FIG. 1 illustrates a method 100 of generating an ontology, according to an exemplary aspect of the present invention.

Referring now to the drawings, and more particularly to FIGS. 1-12, there are shown exemplary embodiments of the method and structures of the present invention.

As illustrated in FIG. 1, an exemplary aspect of the claimed invention includes a method 100 of generating an ontology. The method 100 includes determining (110) plural concepts from a data set by using a first predetermined pattern, using (120) a second predetermined pattern to determine a relationship between the plural concepts, and between a concept and a concept token in the plural concepts, and generating (130) the ontology based on the relationship.

The method 100 may also include, for example, updating the ontology for a change in the data set to generate an updated ontology. Further, updating the ontology may include automatically updating the ontology using a predetermined rule (e.g., updating the ontology without any intervening human interaction).

Further, determining (110) plural concepts may include generating a source ontology from a source web service collection, and a target ontology from a target web service collection (e.g., ontology learning). In addition, using (120) a second predetermined pattern to determine a relationship between the plural concepts, and between a concept and a concept token in the plural concepts, may include matching the concepts in the source ontology to the concepts in the target ontology. Further, generating (130) the ontology may include computing a score for the matched concepts, and filtering the matched concepts based on the score to determine the final matched set of web services.

Semantic web services represent the next generation of web services, which is designed to support automatic discovery, matching and composition of web services. However, it is difficult to automatically execute these tasks because the interface descriptions of web services are often terse and cryptic, especially when the services are generated by wrapping legacy code.

The present invention focuses on improving the quality of automatic web service matching, as both the discovery and the composition tasks depend on it. Current industry standards describe a service as a collection of operations (e.g., Web Service Definition Language (WSDL), Ontology Web Language (OWL)) where an operation is defined by its signature (i.e., operation name, input and output parameter names and types). In this setting, two web services are considered to match if their operations match; two operations match if their names and input and output parameters match.

Thus, the problem of matching web services can be reduced to the problem of matching names (i.e., tags) and types.

Currently, there are two main approaches to this problem: (1) exact tag matching and (2) dictionary-based tag matching. The former involves searching for web services that use the same words to describe similar concepts. The quality of the matched web services is very high, but the chances of finding such perfect matches are very low. The latter technique allows the use of related words (e.g., synonyms) to describe the same concepts. Thus, the chances of finding matching web services are higher, even though the quality of the matched web services is not always perfect. Both techniques have proven useful, but limited because they treat each tag as a bag of words.

The present invention, on the other hand, involves an ontology-based approach that captures the relationships between tokens inside tags. The idea is to build ontologies based on the web services information, and use the ontologies to guide the matching process. The present invention provides a novel approach to matching software applications (e.g., including Web services) in the presence of semantic ambiguity.

Figure 2:
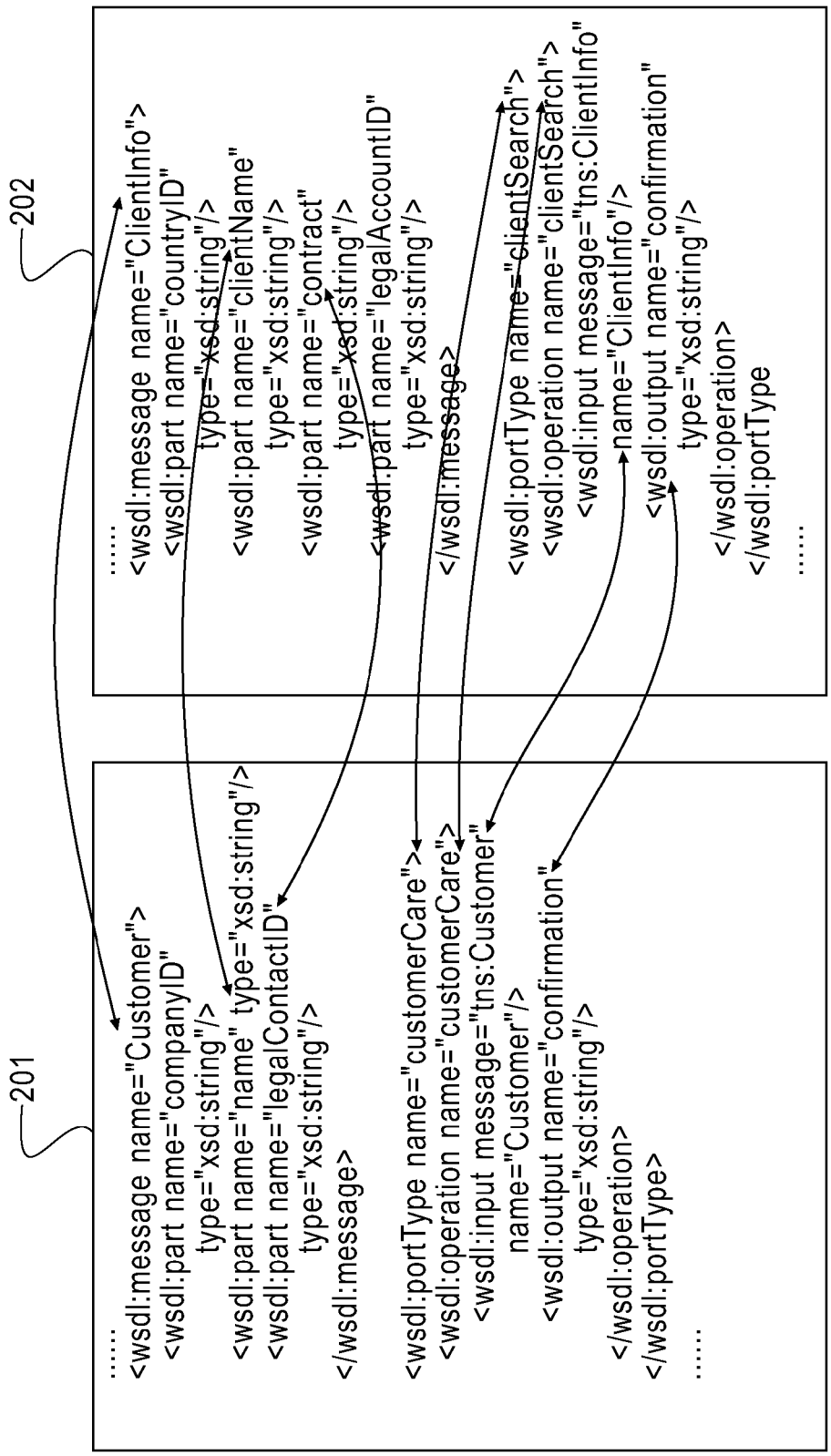
FIG. 2 illustrates parts of an example WSDL source file 201 and an example WSDL target file 202.

FIG. 2 shows parts of an example WSDL source file 201 and an example WSDL target file 202. The matching tag pairs (e.g. "name" in file 201, and "clientName" in file 202) contain common tokens or synonyms. Based on this observation, one can find matches automatically using a dictionary, then find final matches using a filter.

Dictionary Based Approach

The process of the dictionary-based approach contains three stages: tag processing, finding matches, and filtering.

The tags are processed to capture semantical information. The tag processing may involve:

1. Tokenization: Some delimiters are defined to find word boundaries in a tag containing several tokens. A delimiter may be a punctuation, a underscore, or change of case. For example, the tag "clientName" will be tokenized into two tokens "client" and "Name";

2. Abbreviation expansion: Some tags contain the abbreviations of tokens.

For example, the tag "ClientInfo" is the abbreviation of "ClientInformation". We use a human-built abbreviation list to do the expansion; and 3. Synonym Search: For each token, a list of synonyms is built using a dictionary.

To find matches, a "similarity score" is defined between tags. The similarity score between two tags A and B may be given by:

$$\text{Score}(A,B) = \text{synonynsNum}/\max(\text{len}(A), \text{len}(B)) \quad \text{Equation (1)}$$

where synonymsNum is the number of matching tokens (e.g., the tokens have common synonyms). The similarity score describes how semantically similar two tags are. For example, to compute the similarity score between the tags "CustomerCare" and "ClientSearch", the tags are processed, then a similarity score is computed using the above Equation (1). Since "Customer" and "Client" are synonyms but "Care" and "Search" are not, the score is 0.5.

All matches whose scores are greater than 0 are put into a candidate set. For example, FIG. 3 illustrates the candidate matches obtained using the message parts in source file 201 and target file 202 of FIG. 2.

Filtering may then be used to select the best match from the candidate set. In filtering, it may be assumed the matches between interfaces are one-to-one mappings (although this is not always true). A greedy filter is designed to find the matches with higher scores. To do this, the greedy filter first sorts all the matches using the scores, then selects the match with the highest score, puts that match in the set of final matches and removes that match from the candidate match set. This process continues until all matches are removed from the candidate match set. Since one-to-one mapping is assumed, a match will not be put into the final match set if there is a conflicting match (i.e., same source or same target) in the final match set.

Figure 3:
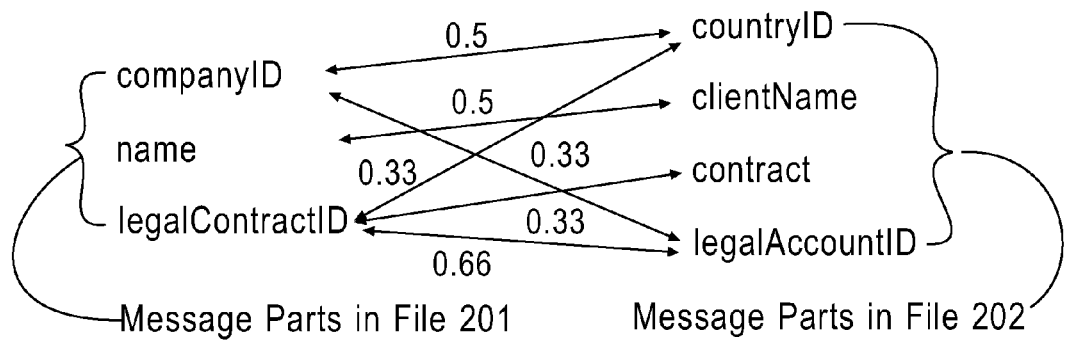
FIG. 3 illustrates the candidate matches obtained using the message parts in source file 201 and target file 202 of FIG. 2.

For example, for the matches illustrated in FIG. 3, the greedy filter would choose three matches with the highest scores: "companyID" to "countryID", "name" to "clientName", "legalContractID" to "legalAccountID". However, only one of the matches is correct, which is "name" to "clientName". The tags "CompanyID" and "CountryID" should not be matched since "CompanyID" is about a company, while "CountryID" is about a country. The tag "legalContractID" should be matched to "contract" instead of "legalAccountID".

The reason for the mistakes is that the dictionary-based approach treats each tag as a simply bag of words. This is a limitation since there are relationships between words in a tag. In contrast, the ontology-based approach of the present invention may improve the performance and eliminate such mistakes.

Ontology-based Approach

To capture the relationships between tokens, the claimed invention may use an ontology-based approach to refine the dictionary-based approach.

Figure 4:
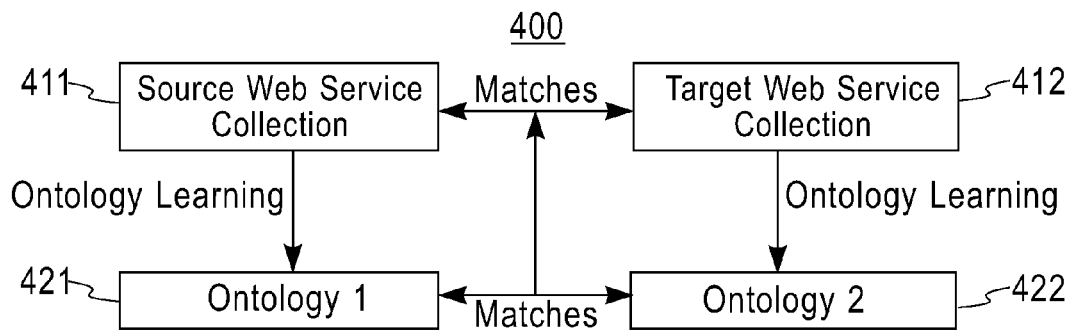
FIG. 4 illustrates an exemplary architecture 400 of the ontology-based approach, according to an exemplary aspect of the present invention.

FIG. 4 illustrates an exemplary architecture 400 of the ontology-based approach. The idea is to extract an ontology from the source web service collection, and another ontology from the target web service collection, and then perform matching at the ontological level and use the matches between ontologies to generate matches at the web service level.

The ontology-based approach may begin with ontology learning in which, given a collection of web services, some rules are defined to generate an ontology from the collection. In an exemplary aspect of the present invention, an ontology learning model may be used to extract and save interface concepts and their relationships as ontologies, based on these rules. The rules may include, for example:

1. Rule for Transferring Web Service Elements into Ontology Relationships

Figure 5A:
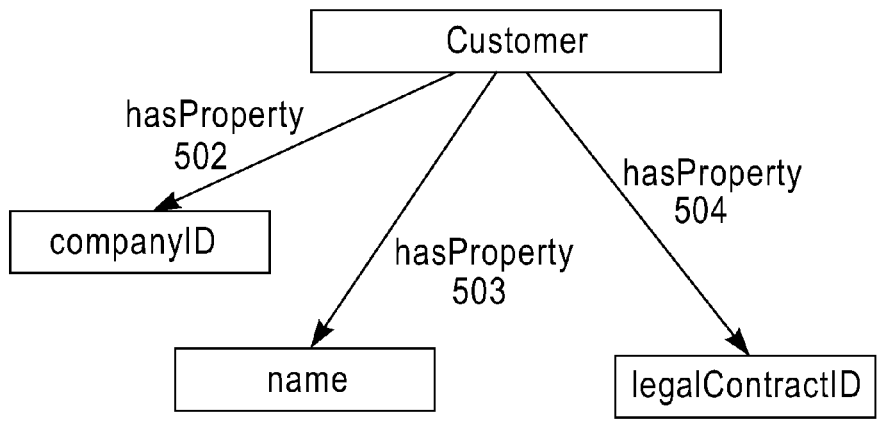
FIGS. 5A-5D illustrates rules for generating an ontology, according to an exemplary aspect of the present invention.

FIG. 5A illustrates a Rule for transferring Web service elements into ontology relationships, according to an exemplary aspect of the present invention.

In this rule, the hierarchical structures of web services are analyzed and transferred into ontology relationships. For example, the message "Customer" in FIG. 1 contains three parts: "companyID", "name" and "legalContractID". The ontology is updated by adding three statements 502, 503, 504 (e.g., relationships): "Customer hasProperty companyID", "Customer hasProperty name" and "Customer hasProperty legalContractID". Other types of elements are also transferred into ontology relationships using similar rules.

2. Noun Phrase Rule 1

Figure 5B:
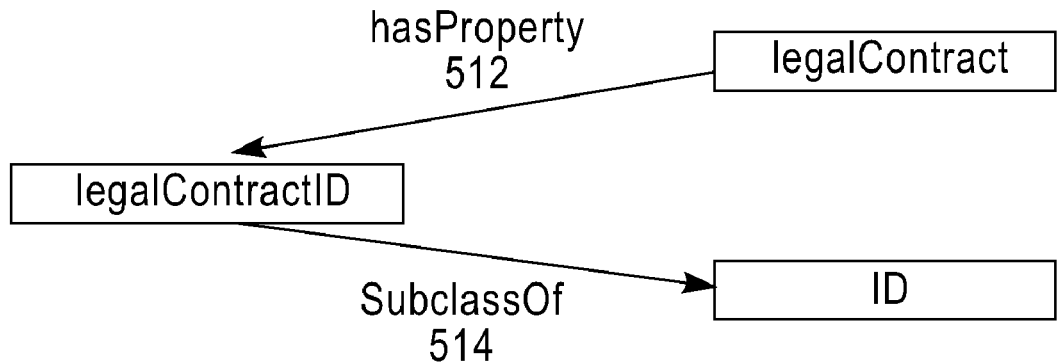

FIG. 5B illustrates Noun Phrase Rule 1, according to an exemplary aspect of the present invention.

If a tag "Tag" has the pattern "Prefix+Noun1+Noun2", assume that the tag is a noun phrase, and add the following statements 512, 514 (e.g., relationships) into the ontology: "'Prefix+Noun1' hasProperty Tag" and "Tag subclassOf Noun2". For example, the tag "legalContractID" has the required pattern, so two statements are added to the ontology: "legalContract hasProperty legalContractID" and "legalContractID subclassOf ID".

3. Noun Phrase Rule 2

Figure 5C:
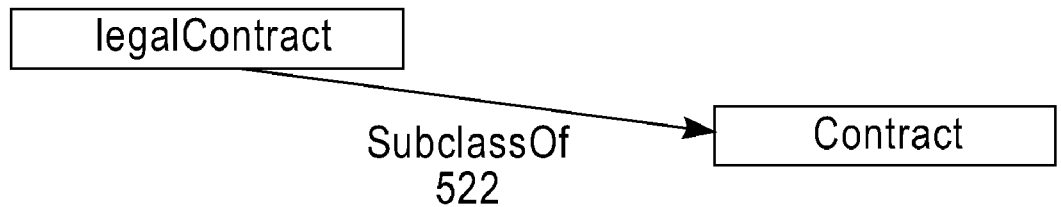

FIG. 5C illustrates Noun Phrase Rule 2, according to an exemplary aspect of the present invention.

If a tag "Tag" has the pattern "Adjective+Noun", assume that the tag is a noun phrase and add the following statement 522 into the ontology: "Tag subclassOf Noun". For example, the tag "legalContract" has the required pattern, so the statement is added: "legalContract subclassOf Contract".

4. Verb Phrase Rule

Figure 5D:
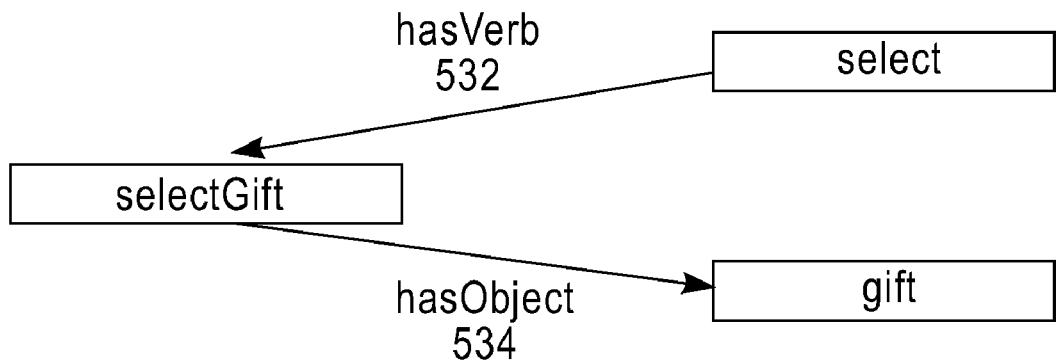

FIG. 5D illustrates a Verb Phrase Rule, according to an exemplary aspect of the present invention.

If a tag "Tag" has the pattern "Verb+Noun", assume that the tag is a verb phrase, and add the following statements 532, 534 into the ontology: "Tag hasObject Noun" and "Tag hasVerb Verb". For example, the tag "selectGift" has the required pattern, so two statements are added to the ontology: "selectGift hasObject Gift" and "selectGift hasVerb select".

Using the above rules, the source ontology 421 may be generated from the source web service collection 411, and the target ontology 422 may be generated from the target web service collection 412.

The ontology-based approach may then proceed by performing ontology matching, in which some rules are defined to match the concepts in the source ontology to the concepts in the target ontology. That is, an ontology matching module may be used to build an initial set of mappings between ontological concepts (e.g., using a predetermined pattern). For example, two concepts may be matched if:

1. The two concepts are synonyms, e.g., Client to Customer; or

2. One of the concepts (or its synonym) is the property of the other, e.g., CountryCode to Country; or 3. One of the concepts (or its synonym) is the subclass of the other, e.g., StatePopulation to Population; otherwise 4. The two concepts are matched only if all the relationships are matched, e.g. ClientLocation to CustomerAddress.

Having matched the concepts in the source ontology to the concepts in the target ontology, the present invention may then go back to web service level and match interfaces. That is, an interface matching module may be used to build the set of interface mappings using the ontology mappings as guidelines. For example, the scores between interfaces may be computed in the following manner:

1. If two concepts are matched at the ontology level, set the score to 1;

2. If two concepts are not matched at the ontology level but any of them belongs a relationship in the ontology, set the score to 0; and 3. Otherwise, it is known that the two concepts do not belong to any relationship and Equation 1 should be used to compute the score.

After obtaining a set of matches with scores, the greedy filter may be used to find the final matches. For the message parts of the source file 201 and target file 202 illustrated in FIG. 2, the greedy filter may choose two matches with the highest scores: "name" to "clientName", "legalContractID" to "contract". The tags "CompanyID" and "CountryID" are not matched since "CompanyID" and "CountryID" are the properties of different objects. The tag "legalContractID" is matched to "contract" since "legalContractID" is the property of "legalContract", and "contract" is the superclass of "legalContract". Therefore, this example illustrates how the ontology-based approach can capture the semantic information in tags more precisely than simply using a dictionary-based approach.

Figure 6:
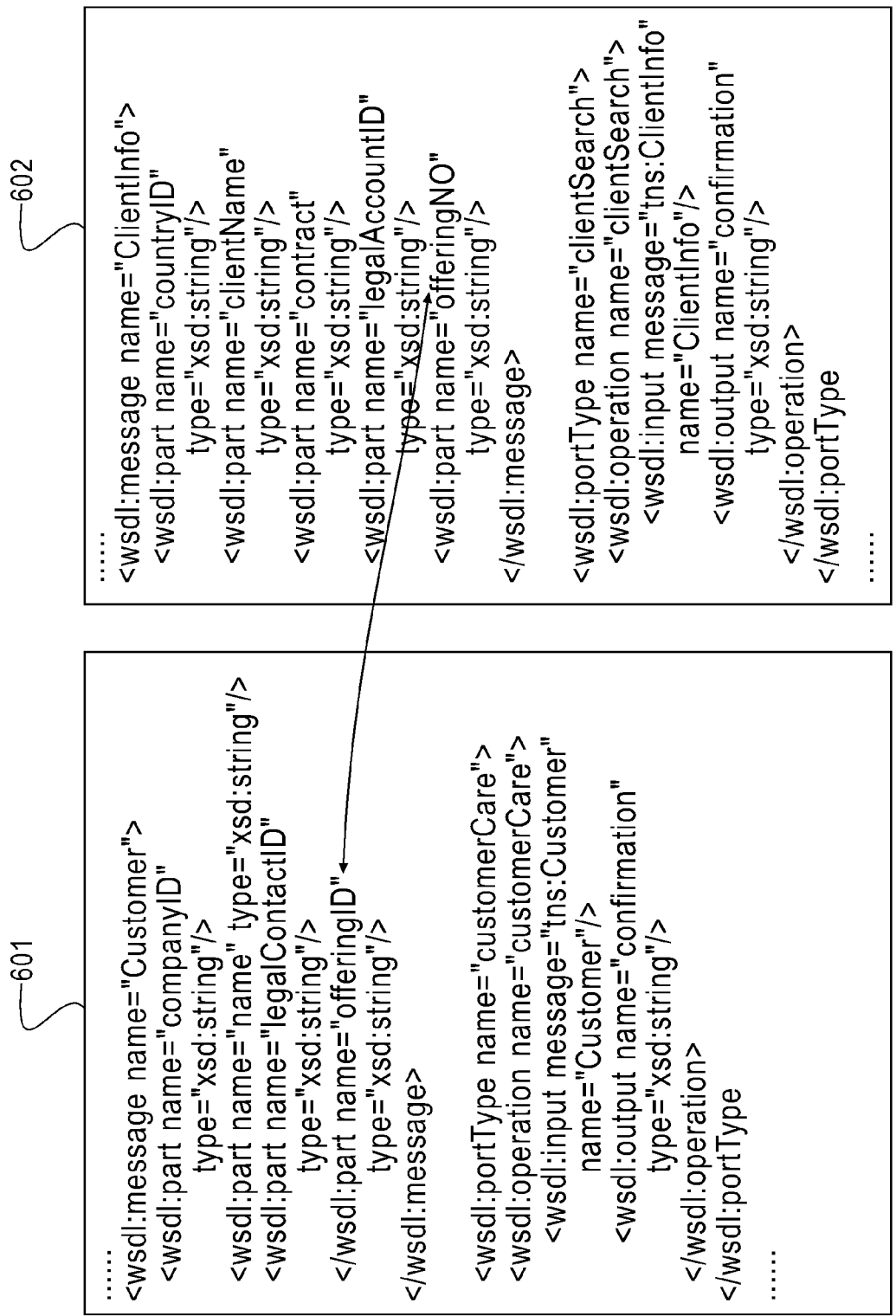
FIG. 6 illustrates two files 601, 602 for illustrating how expert labels may be used to correct mistakes, according to an exemplary aspect of the present invention.

Further, although an unsupervised ontology-based approach is not perfect and may make some mistakes, a human expert may be used to correct these mistakes by using "expert labels" to remove incorrect matches and add missing matches. FIG. 6 illustrates how expert labels may be used to correct mistakes. For example, the following rules may be used to update the learned ontologies using the expert labels:

1. If the tag pairs added by the expert are the properties of the same object but have different superclass, add the superclasses as equivalent classes. For example, if the expert says that "OfferingID" (e.g., in WSDL file 601) and "OfferingNO" (e.g., in WSDL file 602) should be matched, the ontologies is updated by adding the relationship that "ID equivalent ClassOf NO"; and 2. If the tag pairs added by the expert have the same super class but are the properties of different objects, add the objects as equivalent classes. For example, if the expert says that "textID" and "documentID" should be matched, the ontologies is updated by adding the relationship that "text equivalentClassOf document".

After using the "expert labels" to update the ontologies, the matches removed by the expert may be removed from the match set, and the matches added by the expert may be added to the match set.

Figure 7:
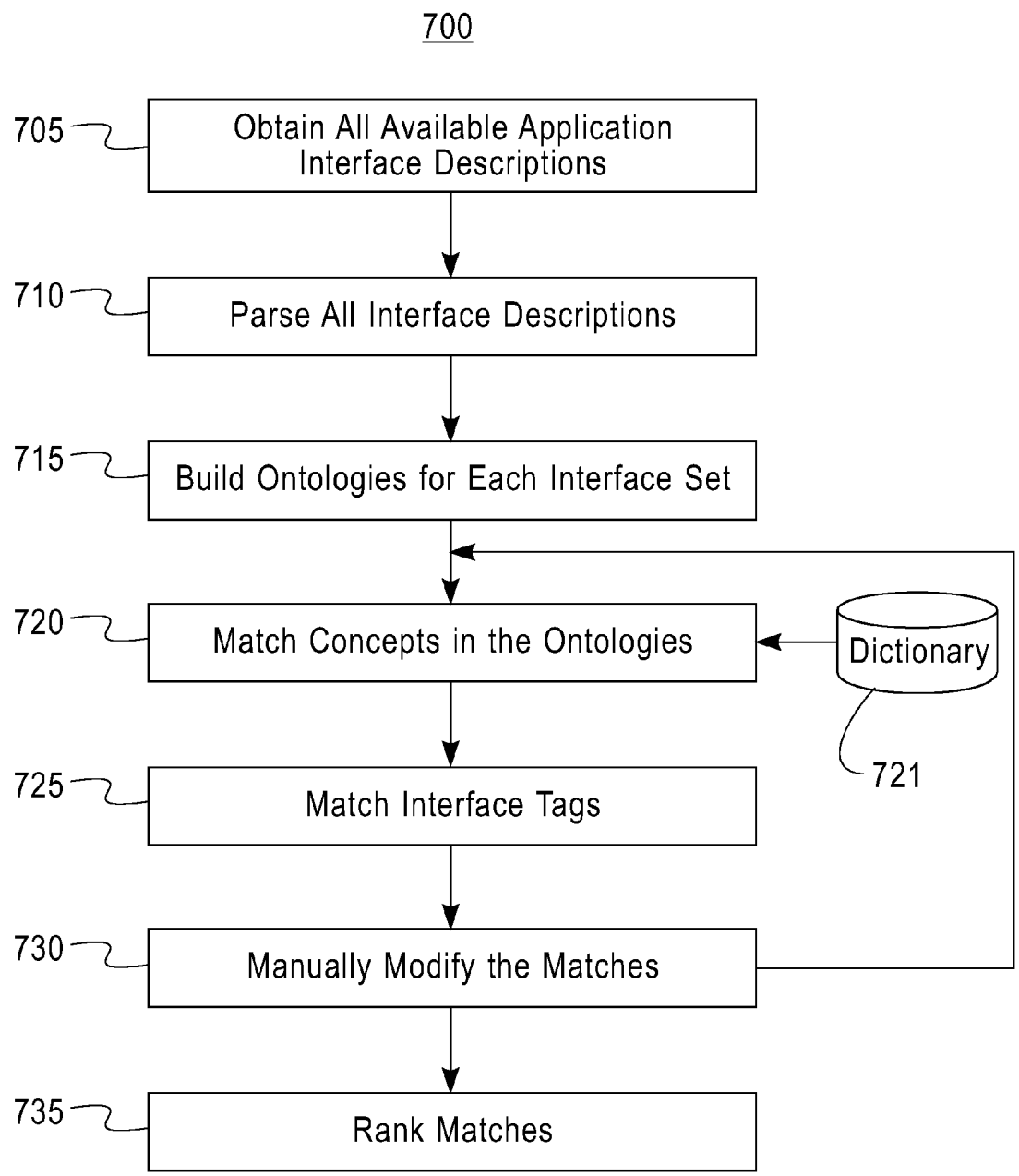
FIG. 7 illustrates a method 700 according to an exemplary aspect of the present invention.

Referring again to the drawings, FIG. 7 illustrates a method 700 according to an exemplary aspect of the present invention. The method 700 includes obtaining (705) all available Application Interface descriptions, parsing (710) all of the Interface descriptions, building (715) ontologies for each interface set, matching (720) concepts in the ontologies using a dictionary 721, matching (725) interface tags, manually modifying (730) the matches (e.g., matched tags), and ranking (735) the matches. Further, as illustrated in FIG. 7, the results of manually modifying (730) the matches may be fed back into the process and used in matching (720) the concepts in the ontologies.

The inventors performed an evaluation to compare the performance of dictionary-based approach and ontology-based approach of the present invention. The evaluation data includes web services in several domains (e.g., customer care, check availability). For each domain, the inventors split web services into source collection and target collection, and asked a human expert to generate matches. The matches generated by the expert were assumed to be the correct matches.

Precision, recall and F-measure were used as the measurement and define the following:

E: the set of matches labeled by the expert.

Correct (C): the number of matches which are generated by the system (according to the exemplary aspects of the present invention) and in the set E.

Incorrect (I): the number of matches which are generated by the system but not in the set E Missing (M): the number of matches which are in the set E but not generated by the system Precision (P): C/(C+1)

Recall (R): C/(C+M)

F-Measure (F): 2*P*R/(P+R)

The size of E (i.e., the total number of matches labeled by the expert) for the inventors' data set is 176, which always equals C+M for any approach.

FIG. 8 provides Table 1 which includes the results of this evaluation. As illustrated in Table 1, the unsupervised ontology-based approach (with all ontology learning rules) gets fewer incorrect matches, but also gets fewer correct matches (i.e., there are many more missing matches) than the dictionary-based approach. A major cause of this is that the rule 4 (the rule about verb phrases) introduces some mistakes. For example, the token "Address" in the tag "AddressType" will be interpreted as a verb by the dictionary, and the whole tag will be interpreted as a verb phrase. However, it is a noun phrase. The same thing happens to the tag "EstimateDate".

After removing the rule 4, the ontology-based approach generates 115 correct matches, which is close to the number of correct matches generated by the dictionary-based approach. On the other hand, the ontology-based approach generates only 26 incorrect matches, which is much less than that of the dictionary-based approach.

Another cause of the mistakes is that the greedy filter is doing one-to-one matching. However, there may be many-to-one and one-to-many matches. For example, both of the "lastName" and "firstName" should be matched to "name". However, the greedy filter will keep only one of them and remove the other, or generate another incorrect match.

Thus, based on these results, the ontology-based approach clearly refines the dictionary-based approach, and in fact, may remove more than 70% of the incorrect matches generated by the dictionary-based approach, and achieve much higher precision and F-measure than the dictionary-based approach. In addition, the ontology learning process is unsupervised and, therefore, easy to extend to other domain.

Further, the ontology-based approach may be further enhanced by performing the ontology learning with advanced natural language processing using context information, web service documentation and tools such as "chunker", or by improving the filter to allow many-to-one and one-to-many mappings.

Figure 9:
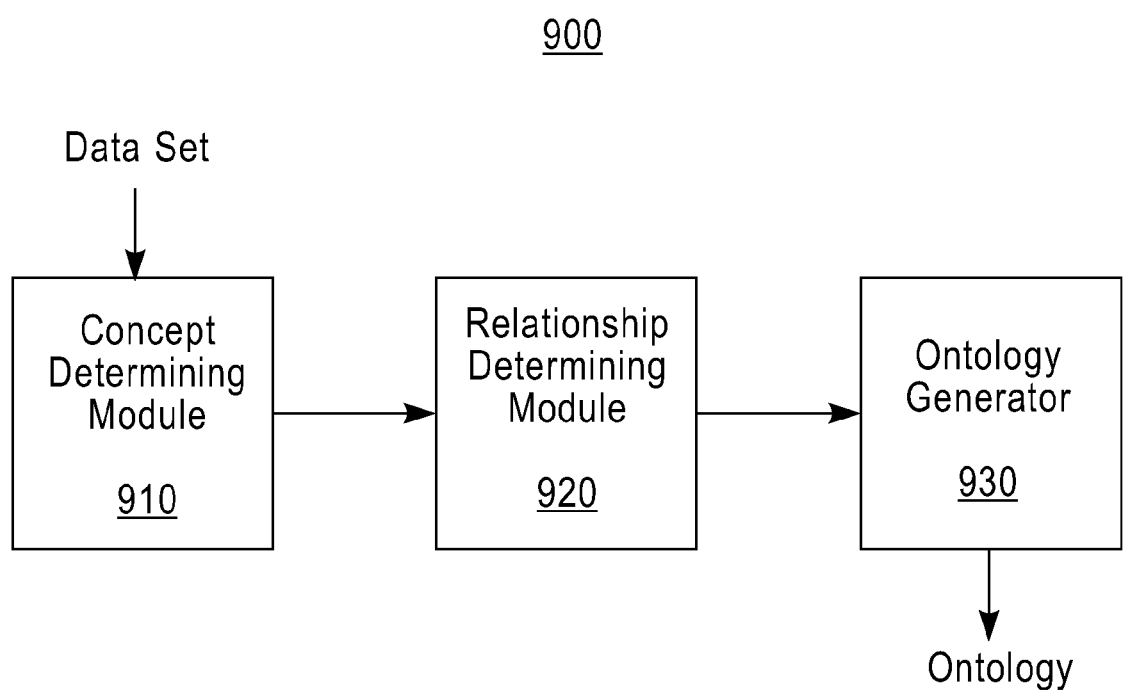
FIG. 9 illustrates a system 900 for generating (e.g., automatically generating) an ontology according to an exemplary aspect of the present invention.

Referring again to the drawings, FIG. 9 illustrates a system 900 for generating (e.g., automatically generating) an ontology according to an exemplary aspect of the present invention. The system 900 includes a concept determining module 910 for determining plural concepts from a data set by using a first predetermined pattern, a relationship determining module 920 for using a second predetermined pattern to determine a relationship between the plural concepts, and between a concept and a concept token in the plural concepts, and an ontology generator 930 for generating the ontology based on the relationship.

Figure 10:
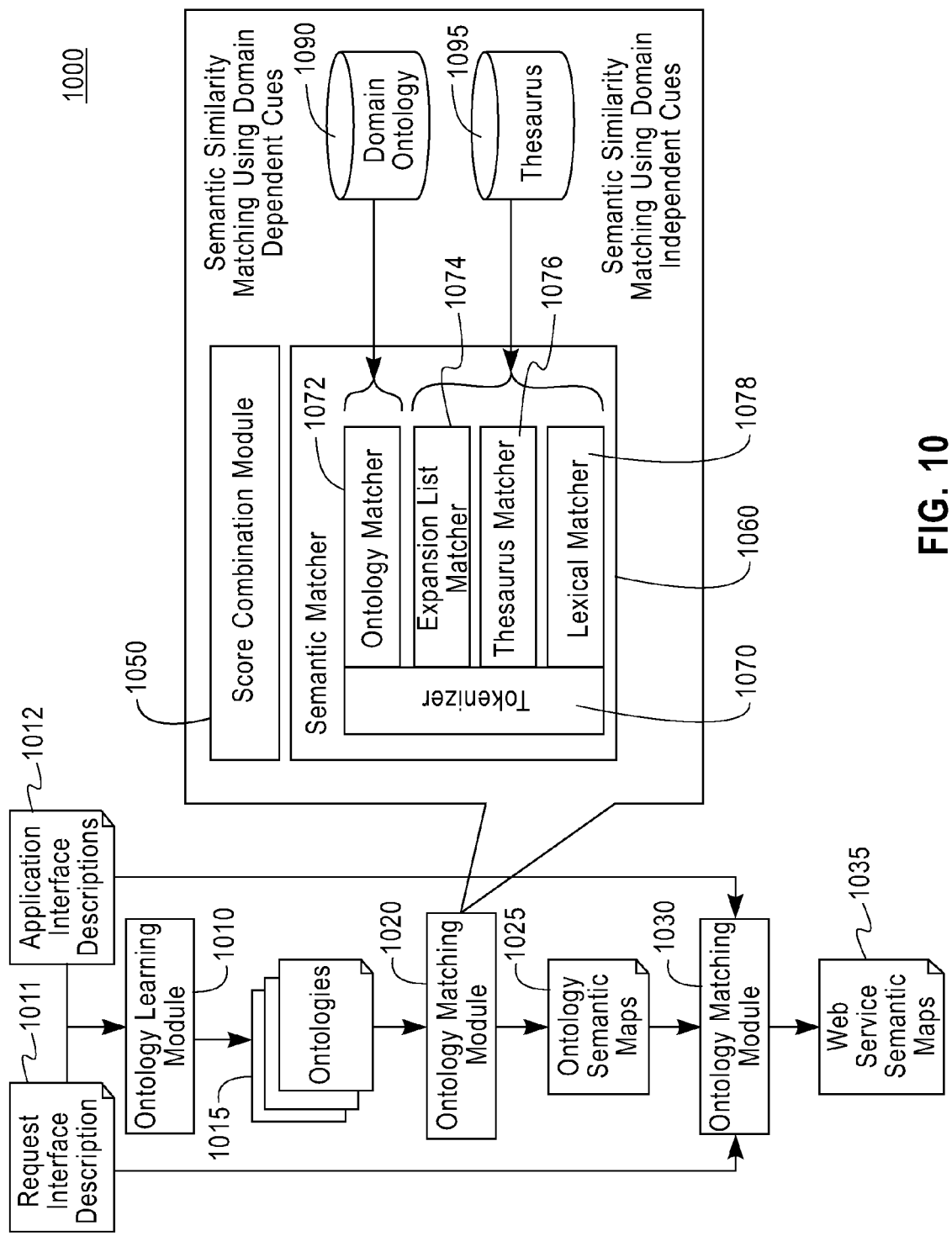
FIG. 10 illustrates another system 1000 for generating (e.g., automatically generating) an ontology according to an exemplary aspect of the present invention.
Figure 12:
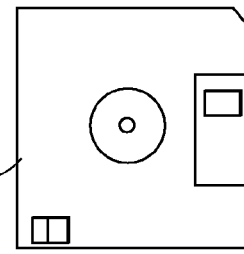
FIG. 12 illustrates a programmable storage medium 1200 tangibly embodying a program of machine-readable instructions executable by a digital processing apparatus to perform the method according to the exemplary aspects of the present invention.

FIG. 10 illustrates another system 1000 for generating (e.g., automatically generating) an ontology according to an exemplary aspect of the present invention. The system 1000 may include an ontology learning module 1010 which receives data (e.g., a request interface description 1011 and an application interface description 1012) for generating ontologies 1015, an ontology matching module 1020 for matching the generated ontologies and generating ontology semantic maps 1025, and an ontology matching module 1030 which receives data (e.g., a request interface description 1011 and an application interface description 1012) and uses the ontology semantic maps 1025 to generate Web Service semantic maps 1035.

Further, the ontology matching module 1020 may include a score combination module 1050 and a semantic matcher 1060 which includes a tokenizer 1070. The tokenizer 1070 may include an ontology matcher 1072 which is coupled to a domain ontology 1090 and performs similarity matching using domain dependent cues. The tokenizer 1070 may also include an expansion list matcher 1074, a thesaurus matcher 1076 and a lexical matcher 1078 which are coupled to a thesaurus 1095 and performs semantic similarity matching using domain independent cues.

Figure 11:
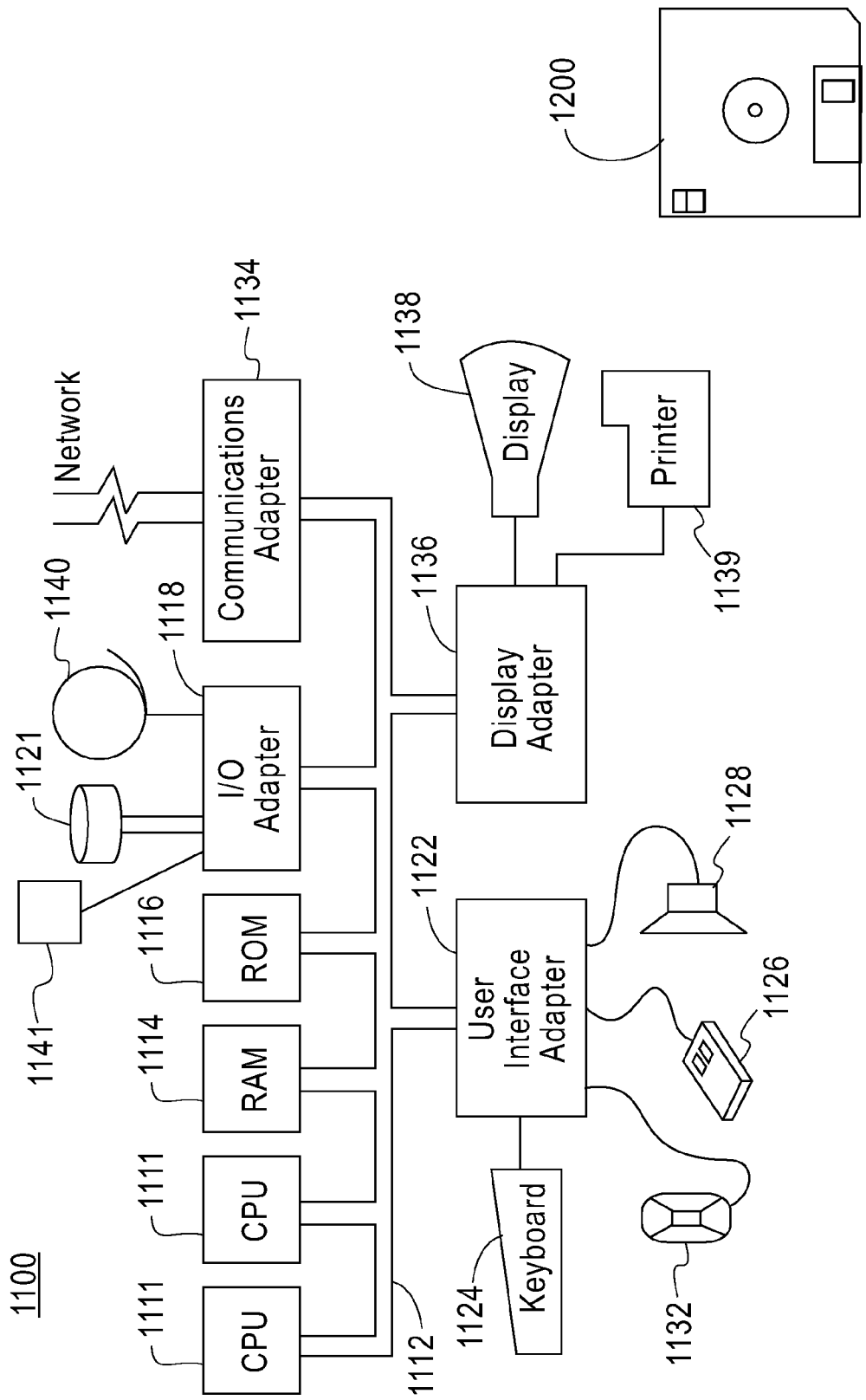
FIG. 11 illustrates a typical hardware configuration 1100 which may be used for implementing the system and method according to the exemplary aspects of the present invention.

Referring again to the drawings, FIG. 11 illustrates a typical hardware configuration 1100 which may be used for implementing the computer system and method according to the exemplary aspects of the present invention. The configuration has preferably at least one processor or central processing unit (CPU) 1111. The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, and Intranet, a personal area network (PAN), etc., and a display adapter 1136 for connecting the bus 1112 to a display device 1138 and/or printer 1139. Further, an automated reader/scanner 1141 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1111 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 1111 and hardware above, to perform the method of the invention.

This signal-bearing media may include, for example, a RAM contained within the CPU 1111, as represented by the fast-access storage for example. Alternatively, the instructions may be contained in another signal-bearing media, such as a magnetic data storage diskette 1700 (FIG. 12), directly or indirectly accessible by the CPU 1111.

Whether contained in the computer server/CPU 1111, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other tangible signal-bearing media including transmission media such as digital and analog media, and tangible signal-bearing media for communication links and wireless communication. In an illustrative embodiment of the invention, the machine-readable instructions may comprise software object code, complied from a language such as "C" etc.

In summary, the present invention provides a novel technique that may dramatically improve the quality of semantic web service matching. For example, the present invention may automatically generate ontologies based on semantic web services, and use these automatically generated ontologies to guide the mapping between web services. Tags can then be related to properties on specific objects. For example, "customerID" would be the identifier attribute on a customer object and "productID" would be the identifier property of a product. In contrast to the conventional "bag of words" approach which would consider these tags to be somewhat similar, because both have the word "ID", the present invention (e.g., using an ontology approach) may provide better discrimination because while the property is the same, the object is different.

With its unique and novel features, the present invention provides a method and system of generating an ontology which may improve a quality of web service matching.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive system is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A method of generating an ontology, comprising:
    determining plural concepts from a data set by using a first predetermined pattern, said determinin plural concepts comprising generating a plurality of web service ontologies;
    using a second predetermined pattern to determine a relationship between said plural concepts, and between a concept and a concept token in said plural concepts; and
    generating, using a computer processor, said ontology based on said relationship.

2. The method of claim 1, further comprising:
    updating said ontology for a change in said data set to generate an updated ontology.

3. The method of claim 2, wherein said updating said ontology comprises:
    automatically updating said ontology using a predetermined rule.

4. The method of claim 1, wherein said determining said plural concepts comprises generating a source ontology from a source web service collection, and a target ontology from a target web service collection.

5. The method of claim 4, wherein said first predetermined pattern comprises:
    web service elements are transferred into ontology relationships;
    if a tag "Tag" has the pattern "Prefix+Noun1+Noun2", it is a noun phrase;
    if a tag "Tag" has the pattern "Adjective+Noun", it is a noun phrase; and
    if a tag "Tag" has the pattern "Verb+Noun", it is a verb phrase.

6. The method of claim 4, wherein said using said second predetermined pattern to determine a relationship between said plural concepts, and between a concept and a concept token in said plural concepts, comprises:
    matching the concepts in the source ontology to the concepts in the target ontology.

7. The method of claim 6, wherein said second predetermined pattern for determining said relationship comprises identifying two concepts as matching concepts if the two concepts are synonyms, if one of the concepts or its synonym is the property of the other, if one of the concepts or its synonym is the subclass of the other, or if all the relationships in the two concepts are matched.

8. The method of claim 6, wherein said generating said ontology based on said relationship comprises:
- computing a score for said matched concepts; and
- filtering said matched concepts based on said score to determine a final matched set of web services.

9. The method of claim 8, wherein a rule for said computing said score includes:
- if two concepts are matched at the ontology level, set the score to 1;
- if two concepts are not matched at the ontology level but either of them belongs to a relationship in the ontology, set the score to 0; and
- otherwise, it is known that the two concepts do not belong to any relationship and the score is given by:

$$\text{Score}(A, B) = \text{synonymsNum}/\max(\text{len}(A), \text{len}(B)) \qquad \text{Equation (1)}$$

where synonymsNum is the number of matching tokens.

10. The method of claim 8, wherein said filtering said matched concepts comprises using a greedy filter.

11. The method of claim 8, further comprising:
- using a human expert to remove incorrect matches from said final matched set of web services and add missing matches to said final matched set of web services.

12. The method of claim 11, wherein a rule used by said human expert includes:
- if tag pairs added by the expert are properties of the same object but have different super-class, add the super-classes as equivalent classes; and
- if tag pairs added by the expert have the same superclass but are properties of different objects, add the objects as equivalent classes.

13. The method of claim 1, further comprising:
- deploying computing infrastructure in which computer-readable code is integrated into a computing system, such that said code and said computing system combine to perform said determining said plural concepts from a data set by using a first predetermined pattern, said using a second predetermined pattern to determine a relationship between said plural concepts, and between a concept and a concept token in said plural concepts, and said generating said ontology based on said relationship.

14. A system for generating an ontology, comprising:
- a concept determining module for determining plural concepts from a data set by using a first predetermined pattern, said determining plural concepts comprising generating a plurality of web service ontologies;
- a relationship determining module for using a second predetermined pattern to determine a relationship between said plural concepts, and between a concept and a concept token in said plural concepts; and
- a computer processor comprising an ontology generator for generating said ontology based on said relationship.

15. The system of claim 14, further comprising:
- an updating module for updating said ontology for a change in said data set to generate an updated ontology.

16. The system of claim 15, wherein said updating said ontology comprises automatically updating said ontology based on said relationship.

17. The system of claim 14, wherein said concept determining module comprises a source ontology generator for generating a source ontology from a source web service collection, and a target ontology generator for generating a target ontology from a target web service collection.

18. The system of claim 17, wherein said relationship determining module comprises a concept matcher for matching the concepts in the source ontology to the concepts in the target ontology.

19. The system of claim 18, further comprising:
- a scorer for computing a score for said matched concepts; and
- a filter for filtering said matched concepts based on said score to determine a final matched set of web services.

20. A non-transitory programmable storage medium tangibly embodying a program of machine-readable instructions executable by a digital processing apparatus to perform a method of generating an ontology, said method comprising:
- determining plural concepts from a data set by using a first predetermined pattern, said determining plural concepts comprising generating a plurality of web service ontologies;
- using a second predetermined pattern to determine a relationship between said plural concepts, and between a concept and a concept token in said plural concepts; and
- generating said ontology based on said relationship.

* * * * *